United States Patent [19]

Thomas

[11] 4,038,761
[45] Aug. 2, 1977

[54] ELEMENT AND METHOD FOR TEACHING WITH LIQUID CRYSTALS

[75] Inventor: Richard E. Thomas, Chicago, Ill.

[73] Assignee: A. B. Dick Company, Niles, Ill.

[21] Appl. No.: 658,614

[22] Filed: Feb. 17, 1976

[51] Int. Cl.² .............................................. G09B 3/06
[52] U.S. Cl. ..................................................... 35/9 G
[58] Field of Search ................................ 35/9 G, 9 R; 350/160 LC; 283/6, 8 B; 40/130 R, 28 C

[56] References Cited

U.S. PATENT DOCUMENTS

| 3,359,651 | 12/1967 | Mair | 35/9 G X |
|---|---|---|---|
| 3,451,143 | 6/1969 | Thomas et al. | 35/9 G |
| 3,508,344 | 4/1970 | Thomas | 35/9 G |
| 3,617,324 | 11/1971 | Thomas | 35/9 G X |
| 3,632,364 | 1/1972 | Thomas et al. | 35/9 G |
| 3,647,279 | 3/1972 | Sharpless et al. | 40/130 R X |
| 3,816,113 | 6/1974 | Haas et al. | 350/160 LC X |
| 3,880,767 | 4/1975 | Chang et al. | 350/160 LC X |
| 3,888,892 | 6/1975 | Leder | 350/160 LC X |

Primary Examiner—William H. Grieb
Attorney, Agent, or Firm—McDougall, Hersh & Scott

[57] ABSTRACT

An element for use as a teaching, examination and instructional material formed of a sheet having a visible image imprinted thereon and coded images keyed to the visible image in which the coded images are formed with a material, such as liquid crystals, which changes in appearance in response to temperature and in which the material in one of the images has a different temperature response than the material in the others of the images whereby the sheet is capable of multiple use as a teaching, examination and instructional element.

11 Claims, 6 Drawing Figures

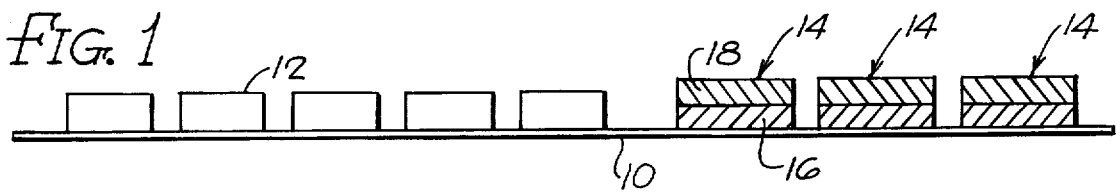
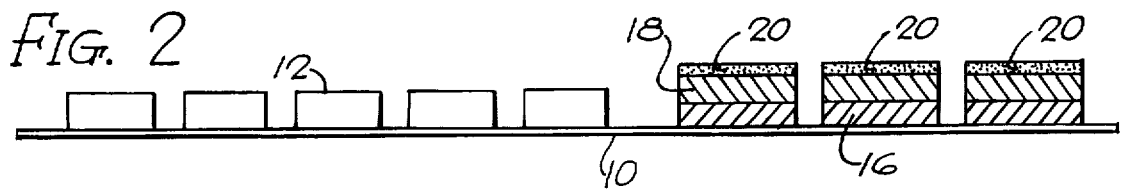
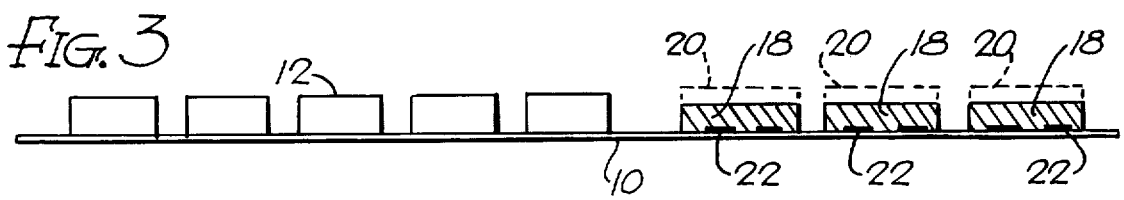
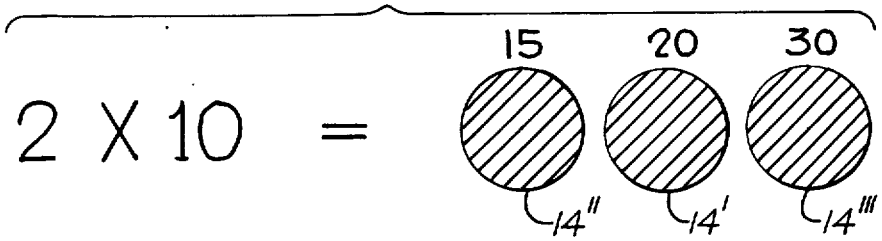
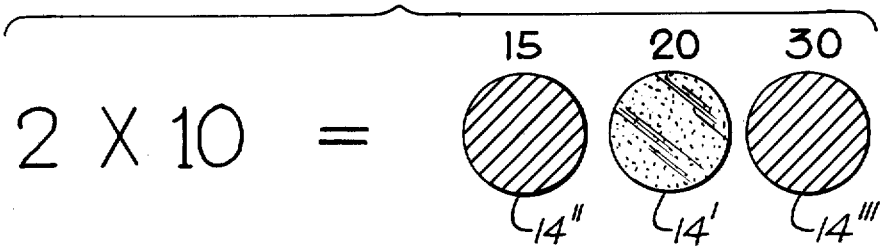
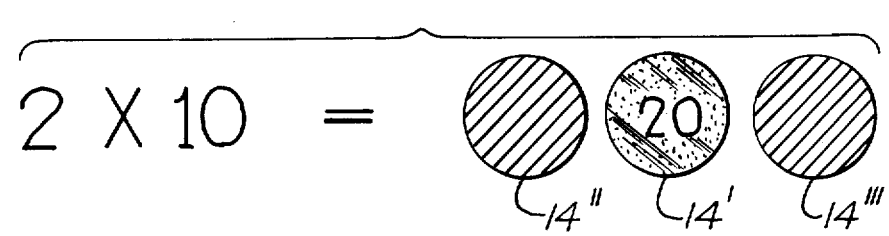

ELEMENT AND METHOD FOR TEACHING WITH LIQUID CRYSTALS

This invention relates to a method for examination, instruction or teaching, and an element for use in the practice of same.

Considerable attention has been given to the use of concealed images keyed to visual instructional material in the field of examination, teaching and self-instruction. In U.S. Pat. Nos. 3,451,143 and 3,632,364, description is made of an instructional sheet formed by spirit duplication wherefrom copy sheets are produced having a concealed image portion keyed to a visible portion. Visual development of the concealed image is based upon a three component system of a receiving material formed of starch or polyvinyl alcohol, an oxidizing agent, and a soluble iodide, in which at least one but not all form the concealed image while the marking material contains the other component. When the concealed image is marked with the marking material, the three components react and iodine is released from the iodide by oxidation for reaction with the starch or polyvinyl alcohol to produce a visible color change.

U.S. Pat. No. 3,617,324 describes an improvement wherein the copy sheet, with the concealed image keyed to the visible image, is produced by sublimation.

In the processes described and others which have made use of concealed images in instructional, teaching or questionaire material, the visible image that is formed by reaction of the components of the concealed image and the component contained in the marking material, is relatively permanent. Thus the sheet is not capable of use for more than one time.

This limitation of the sheet to a single use represents an important factor which inhibits wide acceptance of this teaching, instruction, and testing technique, from the standpoint of cost as well as from the standpoint of the volume of material that must be maintained in inventory, all of which requires space and money.

It is an object of this invention to improve upon the concealed image technique for testing, teaching or instruction by providing a sheet in which, after visual development of the concealed image, the image can be made to revert back to the concealed state, without any indication of its having gone through the cycle, whereby the sheet can be used repeatedly as a testing, teaching, instructional and the like material.

These and other objects and advantages of this invention will hereinafter appear, and for purposes of illustration, but not of limitation, embodiments of the invention are shown in the accompanying drawing in which FIG. 1 is a schematic sectional elevational view of a sheet embodying the practice of this invention;

FIG. 2 is a view similar to that of FIG. 1 showing a modification thereof;

FIG. 3 is a schematic sectional elevational view of a sheet showing a further modification in the practice of this invention;

FIG. 4 is a top plan view of the sheet shown in FIG. 1 in its original state;

FIG. 5 is a top plan view similar to that of FIG. 4, illustrating the change that occurs in response to selection of the correct image; and FIG. 6 is a view similar to that of FIG. 5 of the sheet shown in FIG. 3.

Briefly described, instead of making use of reactants which, when brought together, react to produce a color change that is permanent and incapable of reconversion to the invisible state, reusability of the sheet is permitted by the construction of the imaged portion with crystals that experience a color change in response to change in temperature whereby the image reverts to its original state upon return of the imaged portion to ambient temperature.

The invention will be described by way of a specific example in which use is made of a material referred to generally as liquid crystals, as the component that experiences a color change in response to temperature and which returns to its original state upon return of the crystals to ambient temperature. Representative of liquid crystals of the type described are cholesteryl salts of inorganic or organic acids such as cholesteryl propionate, cholesteryl benzoate, cholesteryl oleyl carbonate, cholesteryl oleate cholesteryl nonanoate, cholesteryl chloroformate, and cholesteryl chloride. Liquid crystals of the type described are available from Edmund Scientific Company as Edmund Part No. 500223 (95°–96.8° F) and Edmund Part No. 500222 (113°–120.2° F), and Eastman Kodak Company and Pressure Chemical Company.

Each has its own transition response temperature and each can be blended in varied proportions to give transition temperature response ranges of 1°–2° C as indicated by the following tabulation:

| Compound and/or Mixture | Percent | Response Range |
|---|---|---|
| Cholesteryl Linoleate | 100 | 45–48° C (113–119° F) |
| Cholesteryl Oleate | 100 | 44–49° C (111–120° F) |
| Cholesteryl Nonanoate | 45 | 33–36° C (91–96.8° F) |
| Cholesteryl Oleyl Carbonate | 55 | |
| Cholesteryl Oleyl Carbonate | — | 34–37° C (93–98.6° F) |
| Cholesteryl Nonanoate | — | |
| Cholesteryl Benzoate | — | 36–37° C (96.8–98.6° F) |
| Cholesteryl Chloride | — | |
| Cholesteryl Oleyl Carbonate | — | |
| Cholesteryl Nonanoate | — | 24–28° C (75–82° F) |
| Cholesteryl Oleyl Carbonate | — | |
| Cholesteryl Butyrate | — | |
| Cholesteryl Nonanoate | 55 | 23–31° C (73–87° F) |
| Cholesteryl Butyrate | 20 | |
| Cholesteryl Linoleate | 25 | |

In the illustrated modification, the sheet 10 has one portion printed with a visible ink to provide a visible image 12 and another portion that is keyed to the visible image that represents the coded images 14.

The coded image is formed with a background layer 16 overcoated with a layer 18 of liquid crystals. In the modification shown in FIG. 2, the layer 18 of liquid crystals is overcoated with a protective coating 20 or substrate of a film from a clear or translucent plastic or resinous material which is not sensitive to temperatures within the color transition range for the liquid crystals. Representative of synthetic or polymeric materials which may be used in forming the protective coating are alkyd resins, polyester resins, acrylic or alkyl acrylic polymers, polystyrene, cellulose acetate, cellulose butyrate or nitro cellulose, phenolic, melamine or urea formaldehyde resins, and the like.

The coded images 14 are formulated to be substantially identical in appearance at ambient temperature so that the observer will derive no indication in advance as to the preference of one image over the other. Yet one is formulated to change in color in advance of the others when the temperature is raised to the transition level. For this purpose, the one is formulated of liquid crystals having a transition temperature differing sufficiently from the others so that only the one will give a color change while the others remain the same in response to increase in temperature to the transition of the one but not the others.

More specifically, in the coded image 14', bearing the correct answer to the question posed by the visible image 12, the layer 18 is formulated of liquid crystals having a transition temperature response in the range of 95°–97° F while the others 14" and 14'" are formulated with liquid crystals having a transition temperature response in the range of 113°–120° F. From the foregoing tabulation, coded images responsive to transition temperature within the range of 95°–97° F can be formulated of a mixture of 45% by weight cholesteryl nonanoate and 55% by weight cholesteryl oleyl carbonate; or a mixture of cholesteryl chloride and oleyl carbonate; or Edmund Part No. 500223; while the coded images responsive to temperatures within the range of 113°–120° F can be formulated of 100% cholesteryl linoleate; 100% by weight cholesteryl oleate; or Edmund Part No. 500222.

In the foregoing example, the transition temperature range of 95°–97° F for the correct image 14' and 113°–120° F for the incorrect images 14" and 14'", is selected to provide a coded sheet that is responsive to body temperature. Thus, when the user places a finger on the image that correctly answers the matter raised by the visible image, the heat transmitted from the finger is sufficient to raise the temperature of the liquid crystals to the transition point whereby color change will take place to indicate that the proper image 14' has been selected. If, on the other hand, the finger is placed on any of the other coded images, the rise in temperature will be insufficient to bring about the color change, indicating that the wrong image has been selected.

Responsive to cool-down of the image through the transition temperature range, as soon as the heat source (finger) is removed, the liquid crystals return to their original state whereupon it again appears the same as the other coded images associated therewith.

The cycle of heating and cooling through the transition temperature range can be repeated many times without change in the character or composition of the coded images, thereby to enable multiple use of the coded sheet.

The overcoating with a protective layer 20 operates to extend the number of cycles through which the coded images can be processed since the protective overcoating will minimize contamination, wear and damage to the liquid crystal layer. Thus the useful life of the sheet is greatly extended.

It will be understood that other temperature responsive materials can be used instead of liquid crystals under the conditions that such materials be characterized by differences in the transition temperature response while their appearance at ambient temperature remains the same, so that such differences in images will not be detectable at ambient temperature.

The base layer 16, underlying the temperature responsive layer 18, serves primarily as a color base intended to compensate for slight differences that may exist in the color of the different temperature responsive layers of the coded images 14. For this purpose, it is preferred to make use of a black base color but other colored base layers can be used.

Where the temperature responsive layers are sufficiently identical in appearance at ambient temperature, the colored base layer may be eliminated, as illustrated in FIG. 3. In such instance, reliance is had on the change of color in the temperature responsive layer 18 for denoting the selection of the correct coded image.

By way of further modification, where the temperature responsive layer converts from an opaque layer to a translucent or transparent layer upon temperature change, the portion underlying the coded image may be imprinted with a visible image 22, as illustrated in FIGS. 3 and 6, to show the correct answer to the question raised by the visible image to which the coded images are keyed.

For example, in answer to the mathematical question of $2 \times 10 = ?$, the portion covered by the coded image having the lower transition temperature response is printed with the numeral 20 so that, when the finger is placed on the coded image, the number 20 will show through as the temperature responsive layer 18 becomes transparent or translucent. The number answer will again be obliterated upon conversion to the opaque state upon return through the transition temperature range.

It will be evident that selection by other means for effecting temperatuere change may be employed, such as a heated marker or the like and that materials sensitive to color change at temperature differing from the above examples may be employed, all within the concepts of this invention.

The materials of the type embodied in the practice of this invention may thus be used in examinations of the multiple choice type wherein only one of a number of printed answers represents the correct answer and which becomes visually identifiable upon pressing the finger to the keyed coded image. Similarly, use can be made of the device as a teaching aid, instruction sheet and the like.

It will be understood that changes may be made in the details of formulation, arrangement and operation without departing from the spirit of the invention, especially as defined in the following claims.

I claim:

1. A device comprising a sheet, a visible image imprinted on the sheet, and coded images keyed to the visible image in which each of the coded images is formed with a layer containing a material which changes color in response to a change in temperature and in which the coded images are substantially identical in appearance at ambient temperature but in which one of the coded images is formed with a material having a color transition temperature differing from the corresponding material in the others of the coded images.

2. A device as claimed in claim 1 in which the material in the one coded image has a color transition temperature below the color transition temperature of the corresponding material in the other images whereby, when the material in the coded images is raised in temperature to the color transition temperature of the material in the one coded image, the one coded image changes in appearance while the others remain the same, and when the material in the coded images cools back down through the color transition temperature the one coded image reverts to its original appearance.

3. A device as claimed in claim 2 in which the color transition temperature of the material in the one coded image is below body temperature but above ambient temperature whereby the change in appearance occurs in response to being touched by a finger.

4. A device as claimed in claim 2 in which the color transition temperature of the material in the one coded image is within the range of 95°-97° F and the color transition temperature of the material in the others of the coded images is within the range of 113°-120° F.

5. A device as claimed in claim 1 in which the coded images include a color layer intermediate the layer of temperature sensitive material and the sheet in which the colored layer is the same in all of the coded images.

6. A device as claimed in claim 5 in which the color layer is black.

7. A device as claimed in claim 1 in which the coded images include a protective coating of a synthetic resinous or polymeric material overlying the temperature sensitive material.

8. A device as claimed in claim 7 in which the protective coating is translucent.

9. A device as claimed in claim 1 in which the coded image converts from an opaque image at ambient temperature to a translucent image at the transition temperature and in which the sheet is imprinted with a visible image underlying the coded image.

10. A teaching and instructional method comprising providing a sheet as claimed in claim 3 in which the visible image poses a subject and one of the coded images represents the correct response to the subject raised by the visible image, placing a finger on the coded image selected by the person as the correct response whereby, when the one coded image has been selected, a change in appearance takes place in the selected coded image and, when the finger is applied to the wrong coded image, no change of appearance takes place, and removing the finger from the selected coded image whereby the coded images revert to their original appearance.

11. A device comprising a sheet, a visible image imprinted on the sheet, and coded visible images keyed to the visible image in which the coded images are substantially identical in appearance at ambient temperature but in which one of the coded images contains a liquid crystal having a color transition temperature above ambient temperature whereby, when the liquid crystal in the coded image is raised in temperature to the color transition temperature of the liquid crystal, the said coded image changes in appearance, and when the liquid crystal in the coded image cools back down through the color transition temperature, the said coded image reverts to its original appearance.

* * * * *